Sept. 13, 1966   L. AXTHAMMER   3,272,495
HYDROPNEUMATIC SUSPENSION UNIT
Filed Aug. 17, 1964   4 Sheets-Sheet 1
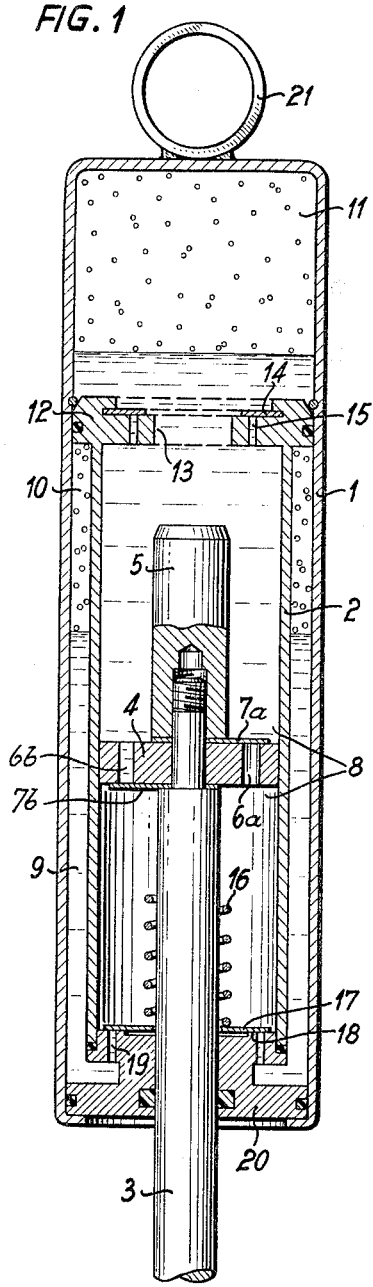
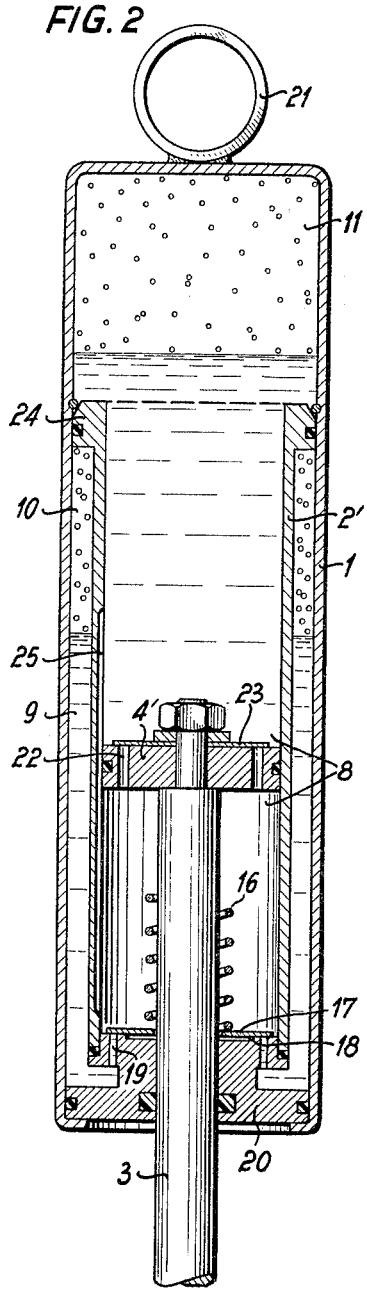
INVENTOR
Ludwig Axthammer
By Richard Ernst
Ag't Sept. 13, 1966    L. AXTHAMMER    3,272,495
HYDROPNEUMATIC SUSPENSION UNIT
Filed Aug. 17, 1964    4 Sheets-Sheet 2

INVENTOR
Ludwig Axthammer
By Richard Ernst
Ag't

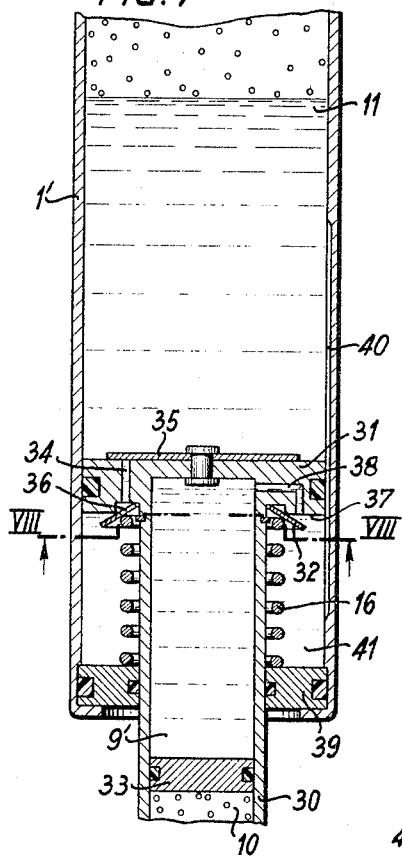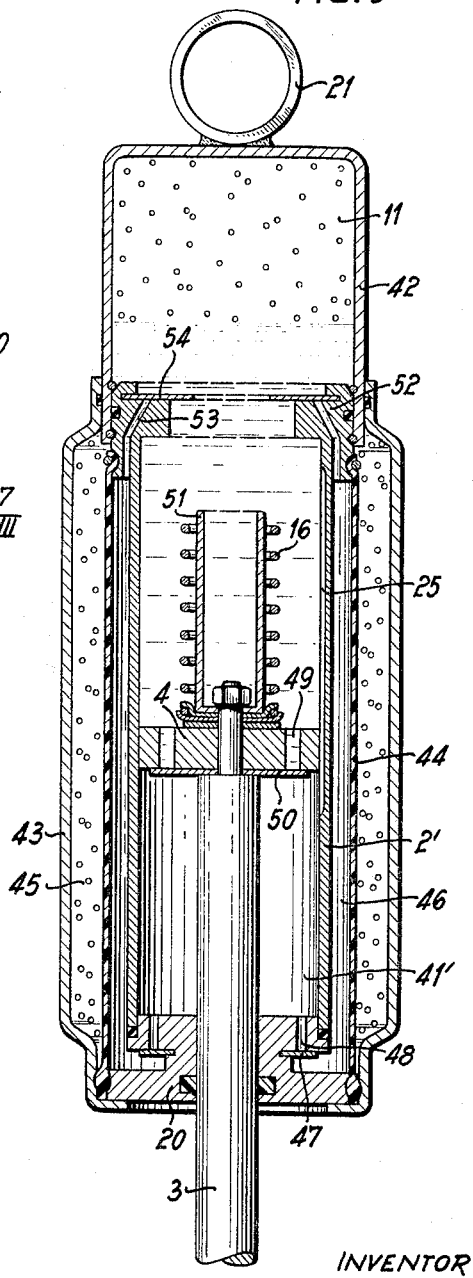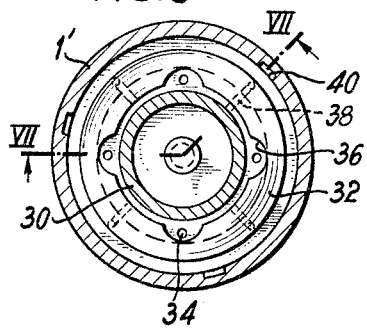

United States Patent Office 3,272,495
Patented Sept. 13, 1966

3,272,495
HYDROPNEUMATIC SUSPENSION UNIT
Ludwig Axthammer, Schweinfurt (Main), Germany, assignor to Fichtel & Sachs A.G., Schweinfurt (Main), Germany, a corporation of Germany
Filed Aug. 17, 1964, Ser. No. 390,063
Claims priority, application Germany, Aug. 20, 1963, F 40,532
19 Claims. (Cl. 267—64)

This invention relates to suspension units suitable for automobiles and other vehicles, and particularly to a self-leveling suspension unit of the air-oil type, hereinafter referred to as a hydropneumatic suspension unit.

In self-leveling hydropneumatic suspension units the effect of a resilient spring interposed between the sprung and unsprung masses of a vehicle is achieved by a cushion of gas enclosed between a cylinder and a piston movable in the cylinder, the piston and cylinder being respectively attached to the sprung and unsprung masses. The damping effect of a shock absorber is obtained by having a liquid in pressure transmitting engagement with the gas cushion, and by providing restricted passages through which the liquid may flow under sufficient gas pressure. Self-leveling is effected by means of a pumping arrangement which automatically increases the amount of liquid in the cylinder, and thereby increases the pressure of the gas cushion, when external pressures move the piston inward of the cylinder beyond a predetermined limit.

An object of the invention is the provision of a self-leveling hydropneumatic suspension unit which is of simple design and includes a minimum number of moving parts so as to be inexpensive, yet rugged and reliable in its operation.

Another object is the provision of a suspension unit which may be relatively short in an axial direction.

The most complex element of many conventional hydropneumatic suspension units is the valve arrangement which controls the flow of reserve liquid between a storage chamber and the cylinder space of the suspension unit. It is a specific object of this invention to provide such a valve arrangement for a suspension unit which combines simplicity and low cost with reliability and long service life.

With these and other objects in view, the invention, in one of its aspects provides a suspension unit in which the space within the cylinder member of the unit is axially divided by a reciprocable piston into two substantially liquid filled compartments. An air cushion is in pressure transmitting engagement with the liquid filled compartments. A storage chamber containing a supply of the liquid is being held under fluid pressure. A resilient valve means is interposed between the storage chamber and one of the compartments in the cylinder space for normally separating the compartment from the chamber under the resilient force of the valve means which include a valve seat member formed with a conduit having respective orifices in the storage chamber and the aforementioned one compartment of the cylinder space, and a valve disk member in the cylinder space compartment and normally sealingly engaging the conduit orifice in the compartment. Yieldably resilient abutment means on the piston member engage the valve disk and move it away from the orifice of the conduit when the piston member approaches one of the terminal positions of its reciprocating movement.

Other features and many attendant advantages of this invention will be readily appreciated as the same becomes better understood from the following detailed description of preferred embodiments thereof, when considered with the appended drawings in which:

FIG. 1 is a fragmentary, axially sectional, elevational view of a suspension unit of the invention;

FIG. 2 shows a modified unit in a view corresponding to that of FIG. 1;

FIG. 7 is partial, axially sectional view of yet another embodiment of the invention taken on the line VII—VII in FIG. 8;

FIG. 8 shows the unit of FIG. 7 in substantially radial plan section on the line VIII—VIII;

FIG. 9 illustrates a further suspension unit of the invention in a view corresponding to that of FIG. 1;

Figure 3:
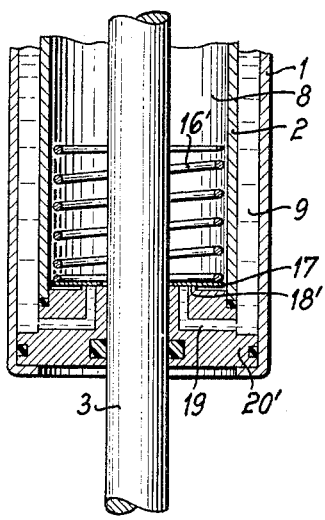
FIGS. 3 to 6 illustrate bottom portions of respective additional suspension units of the invention, otherwise identical with that shown in FIG. 1.

Referring now to the drawing in detail, and initially to FIG. 1, there is shown a suspension unit whose working elements are largely contained within a cup-shaped casing 1. A cylinder 2 is coaxially mounted in the casing and sealingly engages a piston 4 which is axially slidable in the cylinder and whose piston rod 3 projects outward of the casing.

The upper end of the cylinder 2 is held in position within the casing by an integral flange 12, whereas the lower end is engaged by a plug 20 which guides the piston rod 3 and respective portions of which form axial end walls for the cylinder 2 and the open end of the casing 1. A ring 21 fastened to the outside of the casing 1 at the closed end thereof and a similar ring, not illustrated, on the piston rod 3 permit the unit to be interposed between the sprung and unsprung masses of a vehicle in a manner conventional in itself.

A plunger 5 is coaxially mounted on the piston 4 and projects therefrom toward a central opening 13 in the flange 12. The plunger 5 has a greater cross sectional area than the piston rod 3 and is conformingly and axially movably received in the opening 13 when the piston 4 moves upward from the position shown in FIG. 1. Axial bores 15 are spaced in the flange 12 about the central opening 13, and are normally closed by a flat ring 14 of spring metal.

The space within the casing 1 above the partition 12 is largely occupied by a cushion 11 of air, nitrogen, or similar inert gas, and is otherwise filled with hydraulic fluid or oil which also occupies the two compartments 8 above and below the piston 4 in the cylinder 2. The liquid fills much of an annular storage chamber 9 between the cylinder 2 and the casing 1, the remainder of the chamber being filled with compressed gas 10 at a pressure lower than that of the gas cushion 11.

Two axial bores, ducts, or conduits, 6a, 6b pass through the piston 4. In the condition of the apparatus shown in the drawing, the bore 6a is blocked by a valve plate 7a of resilient material such as spring metal which sealingly engages the orifice of the bore 6a in the upper compartment 8 under its resilient force whereas the bore 6b is blocked by an identical valve plate 7b mounted on the face of the piston 4 in the lower compartment 8.

An axially raised, annular portion 18 of the plug 20 in the lower compartment 8 provides a flat seating face for a valve disk 17 of spring metal which is loosely slidable on the piston rod 3, and normally held against the seating face 18 by its weight and by the pressure of the liquid in the cylinder 2. A helical spring 16 is loosely coiled about the piston rod 3 between the disk 17 and the piston 4 and rests on the disk 17. The valve disk 17 seals the orifices of conduits 19 which connect the lower compartment 8 and the storage chamber 9. The spring 16 is axially aligned with a recessed portion of the plug 20 between the piston 3 and the annular seating face 18.

The suspension unit operates as follows:

When the piston 4 is in a position such as that illustrated in which the plunger 5 is withdrawn from the opening 13, and the spring 16 does not exert significant axial pressure on the valve disk 17, the unit acts merely as a spring and shock absorber. Varying loads applied to the ring 21 and to the piston rod 3 cause contraction and expansion of the gas cushion 11 as the piston 4 moves upward and downward in the cylinder 2. The movements of the piston are damped by the liquid filling the cylinder compartment 8 and moving through the throttling passages in the bores 6a, 6b during cylinder movement, the valve plates 7a, 7b respectively opening and closing the associated bores in response to liquid pressure differences in the compartments 8. The self-leveling feature of the unit is not operative and not required.

Under a severe load, the piston rod 3 is driven inward of the casing 1 until the plunger 5 seals the opening 13. Because of the different cross sections of the plunger 5 and of the piston rod 3, the pressure within the cylinder compartments 8 drops abruptly as the plunger 5 moves upward beyond the partition 12. When the pressure in the lower compartment 8 drops sufficiently below that in the storage chamber 9 to balance the weight of the valve disk 17 and of the spring 16, the valve disk is lifted from the seating face 18, and liquid is forced through the bores 19 into the cylinder space from the storage chamber 19 under the pressure of the compressed gas 10.

When the suspension unit expands on the rebound, the plunger 5 moves downward. As long as the opening 13 is blocked, this movement raises the pressure within the cylinder 2. The disk 17 is returned to the seating surface 18, and the spring metal ring 14 is sufficiently deflected by liquid pressure in the bores 15 to permit liquid to pass through the partition 12, and thereby to compress the gas cushion 11. Alternating withdrawal of liquid from the storage chamber 9 and compression of the gas cushion 11 continue during reciprocating piston movement until the plunger 5 is expelled downward from the opening 13, and the normal spacing between the sprung and unsprung masses of the vehicle is restored by the leveling effect of the suspension unit.

If the load on the unit is sharply reduced, the piston rod 3 moves outward of the casing 1 under the pressure of the gas cushion 11, and the cylinder 4 moves downward in the cylinder 2. The helical spring 16 is axially compressed until it can overcome the resistance of the valve disk 17, and the central portion of the valve disk is forced inward of the recess within the annular seating face 18, whereby the peripheral portions of the disk are tilted upward and away from the orifices of the bores 19. Liquid is then forced from the lower compartment 8 through the bores 19 into the storage chamber 9. The reduced amount of liquid in the cylinder 2 causes expansion and lowering of the pressure in the gas cushion 11, whereby the suspension unit tends to shrink, and the normal operating level is restored.

The modified suspension unit illustrated in FIG. 2 is largely similar to that described with reference to FIG. 1, and common features will not be referred to in detail. The cylinder 2' differs from the corresponding element shown in FIG. 1 by having a narrow external flange 24 merely wide enough axially to seal the storage compartment 9. Narrow axial grooves 25 of which only one is seen in the drawing extend over the lower two thirds of the inner cylinder wall, and provide throttling passages which by-pass the piston 4' when it operates normally within range of the grooves 25, as illustrated. Axial bores 22 circumferentially arranged in the piston 4' are normally sealed by a circular spring plate 23 centrally and coaxially fastened on the upper face of the piston 4', and thus capable of being peripherally lifted from the piston 4' by sufficiently high liquid pressure in the bores 22.

When the piston 4' is in a position low enough that it is by-passed by the grooves 25, yet not so low as to exert significant pressure on the valve disk 17 by abutment of the spring 16, the unit operates as a vehicle spring and shock absorber, the flow of liquid between the cylinder compartments above and below the piston 4' being damped by throttling passage through the grooves 25.

When a high external load drives the piston 4' into the upper third of the cylinder 2', the oscillations of the piston cause additional liquid to be pumped from the storage chamber 9 into contact with the gas cushion 11. Upward movement of the piston 4' compresses the cushion 11 and draws liquid from the chamber 9 through the bores 19 into the lower compartment 8 in the cylinder 2'. Downward movement of the piston 4' causes the valve disk 17 to block the bores 19, while the plate 23 is lifted from the orifices of the bores 22 to permit upward flow of liquid through the piston 4'.

Liquid is returned from the cylinder 2' to the storage chamber 9 in the same manner as described with reference to FIG. 1, when a reduction in external load causes the piston rod 3 to move outward of the casing until the spring 16 is forced against the valve disk 17 by the piston 4'.

FIGS. 3 to 6 show modifications of the suspension unit illustrated in FIG. 1, which differ from the first-described embodiment in the valve arrangement which connects the cylinder space with the liquid storage chamber. It will be appreciated that these modifications may equally be used with the unit shown in FIG. 2.

The plug 20' illustrated in FIG. 3 has an axially projecting, flat, annular seating face 18' contiguously adjacent the piston rod 3, and is recessed near the cylinder 2. The bores 19 which extend from orifices in the seating face to the storage chamber 9 are correspondingly arranged, and are covered by the central portion of the valve disk 17, not itself different from the corresponding elements shown in FIGS. 1 and 2. The valve disk 17 cooperates with a spring 16' which is of sufficient diameter to be axially aligned with the recessed peripheral portion of the radial plug surface in the lower compartment 8.

When the spring 16' is moved downward by the piston 4, not itself seen in FIG. 3, and is sufficiently compressed to overcome the resistance of the disk 17, the latter is deformed into a dished or conical shape tapering in an upward direction, and the orifices of the bores are opened.

Figure 4:
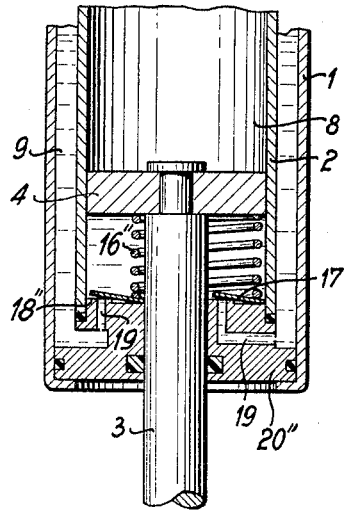

Yet another valve arrangement is shown in FIG. 4. In this arrangement, the axis of the spring 16" is parallel to the common axis of the piston 4 and cylinder 1, but is radially offset therefrom. The spring is intermediate in diameter between the springs 16 and 16'. The annular seating faces 18, 18' are replaced by spaced, individual, flat projections 18" on the plug 20" in which the bores 19 have their orifices. The manner in which the normally flat valve disk 17 is resiliently deformed under the pressure of the abutting spring 16" to open the bores 19 is evident from the drawing.

Figure 5:
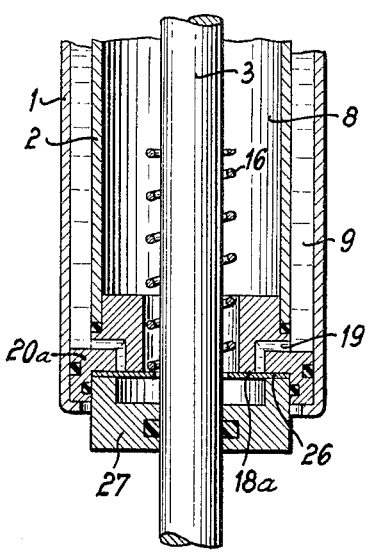

In the embodiment of the invention shown in FIG. 5, a centrally apertured plug 20a provides a bottom wall for the storage chamber 9, and partly closes the lower end of the cylinder compartment 8 with sufficient clearance about the piston rod 3 to permit passage of the spring 16. An outer annular seating face 18a of the plug 20a extends about the central aperture in the plug and normally engages a contact face of a flat, annular, resilient disk 26 whose periphery is clamped fast between the plug 20a and a cap 27 in which the piston rod 3 is guided. The spring 16 abuts against the upper face of the disk 26. Bores 19 in the plug 20a have respective orifices in the storage chamber 9 and in the seating face 18a.

When the piston, not seen in FIG. 5, approaches the lower terminal portion of its stroke, it drives the spring 16 downward until the compressed spring deflects the central portion of the disk 26 from the orifices of the bores 19, and communication is established between the bodies of liquid in the lower compartment 8 and in the storage chamber 9 through the central aperture in the plug 20a. When the pressure in the compartment 8 becomes sufficiently lower than that in the storage compartment, the disk 26 is deflected by the pressure difference to admit liquid from the storage chamber to the cylinder space.

Figure 6:
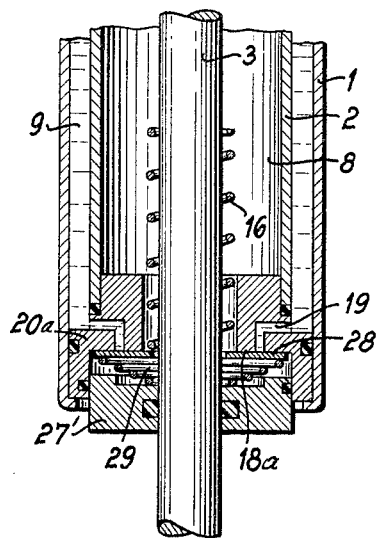

The valve arrangement illustrated in FIG. 6 differs from all other embodiments of the invention shown in the drawing by a valve disk 28 which is rigid and which is loosely slidable on the piston rod 3 in an arrangement otherwise closely similar to that shown in FIG. 5. A modified cap 27' sealingly engages the plug 20a and the piston rod 3. The valve disk 28 is biased toward the orifices of bores 19 in a seating face 18a of the plug 20a by a spiral spring 29 which is interposed between the disk 28 and the cap 27'.

In the suspension unit illustrated in FIGS. 7 and 8 a storage chamber 9' for hydraulic fluid is provided in the upper portion of the hollow rod 30 of a piston 31. The compressed gas 10 which holds the liquid in the chamber under pressure is retained in the lower part of the piston rod 30, and is separated from the liquid by a floating partition 33.

The piston 31 is axially movable in sealing engagement with the internal cylindrical wall of the casing 1' which has narrow axial grooves 40 in the manner of the cylinder 2' described hereinabove with reference to FIG. 2, and for the same purpose. The lower end of the casing 1' is closed by a centrally apertured plate 39 in which the piston rod 30 is guided.

The piston 31 separates an air cushion 11 and an associated body of liquid in the upper end portion of the casing 1' from a liquid filled pumping compartment 41 below the piston. Four bores 38 in the piston 31 have orifices in the storage chamber 9' and in an axially projecting annular seating face 37 on the underside of the piston 31. The corresponding annular recess 36 between the seating face 37 and the piston rod 30 accommodates orifices of bores 34 which pass axially through the piston 31 from the chamber 41. An internally notched, flat, resilient disk 32, best seen in FIG. 8 normally lies flat on the seating face 37 to block the bores 38 while giving free access to the bores 34 through its notches. In the illustrated position of the piston 31, a spring 16 which is coiled about the piston rod 30 is being compressed between the disk 32 and the plate 39, and the disk 32 is conically deformed by the pressure of the spring 16 to open the bores 38.

Another resilient, circular disk 35 is centrally fastened to the face of the piston 31 opposite the gas cushion 11. Its peripheral portion overlaps orifices of the bores 34 as long as the liquid pressure in the pumping compartment 41 does not materially exceed the liquid pressure under the gas cushion 11.

The operation of the suspension shown in FIGS. 7 and 8 is closely analogous to that of the device described hereinabove with reference to FIG. 2. The illustrated position is assumed by the unit when it is relieved of a load so that the piston rod 30 travels outward of the casing 1' beyond the normally desired range of operation. Liquid is being returned from the space between the gas cushion 11 and the piston 31 to the storage chamber 9'.

When a high external load drives the piston 31 into the top portion of the casing 1' free from notches 40, the pressure in the pumping compartment 41 becomes lower than that in the storage chamber 9', the disk 32 operates as a spring loaded check valve which responds to the pressure differential by opening the passages 38 so that additional liquid is admitted to the pumping space. When the piston 31 moves outward of the casing 1' during a subsequent rebound, the resulting higher pressure in the pumping compartment 41 closes the bores 38 and opens the bores 34 by displacing the disk 35, whereby additional liquid is admitted to the compartment above the piston 31.

When the piston 31 operates within range of the grooves 40, but is sufficiently removed from the plate 39 not to compress the spring 16, the unit performs only its spring and shock absorber functions.

The suspension unit illustrated in FIG. 9 differs from those described so far by a gas cushion for maintaining the stored reserve liquid under a pressure higher than that of the rhythmically expanding and contracting gas cushion which provides the spring effect of the unit.

The casing of the suspension unit consists of a cup-shaped top portion 42 which encloses the gas cushion 11 and a varying amount of liquid, and a tubular bottom portion 43 of partly enlarged diameter. A centrally apertured flange 52 integral with a cylinder 2' is fastened to the casing portion 42. Grooves 25 axially extend over about two thirds of the axial length of the cylinder 2' near the flange 52. The bottom of the cylinder 2' and the bottom of the casing portion 43 are sealed by a plug 20. A tubular, resilient membrane 44 separates the space between the cylinder 2' and the casing portion 43 into two coaxial chambers of annular cross section. A strongly compressed gas 45 occupies the outer chamber. The inner chamber 46 serves as a liquid storage chamber.

A piston rod 3 is slidably sealed in the plug 20 and carries a piston 4 which is provided with peripheral axial bores 49 normally blocked by a resilient valve disk 50 whose central portion is fastened between the piston rod 3 and the piston 4. The upper face of the piston 4 carries a coaxial tubular guide 51 on which a helical compression spring 16 is loosely coiled. The guide 51 is aligned with a conforming central opening in a flat, annular disk 54 of resilient material which is peripherally fastened on the flange 52 so as normally to cover the orifices of bores 53 which are downwardly open to the storage chamber 46. The spring 16 is axially aligned with the free internal rim of the disk 54 which projects into the central aperture of the flange 52.

Bores 48 in the plug 20 are normally closed by a one-way valve constituted by a resilient disk 47, and are opened in response to high pressure in a pumping compartment 41' between the piston 4 and the plug 20 for return of liquid to the storage chamber 46.

The suspension unit illustrated in FIG. 9 operates as follows:

In the illustrated normal position of the piston 31, the unit combines the functions of a vehicle spring and shock absorber. Reciprocating movement of the piston 31 causes alternating compression and expansion of the gas cushion 11, and piston movement is damped by the throttling effect of the narrow grooves 25 on the flow of liquid into and out of the pumping compartment 41'.

When the piston is moved upward by heavy external pressure the spring 16 engages the resilient disk 54 and lifts it from the orifices of the bores 53, whereby additional liquid is admitted into pressure transmitting engagement with the gas cushion 11, and the piston 4 is returned to the illustrated desired position.

When the piston 4 moves downward beyond the range of the grooves 25 as the external load is reduced, the resulting higher pressure in the pumping space 41' drives liquid through the bores 48 into the storage compartment 46. On the rebound of the piston, the pressure in the pumping compartment is lowered sufficiently to open the valve disk 50, and to withdraw liquid from the air cushion 11 to the pumping space. This pumping action continues as the piston reciprocates in the cylinder 2' until the lower ends of the grooves 25 are uncovered and the piston 4 is returned to a position corresponding to the normal level of the sprung vehicle masses.

Figure 10:
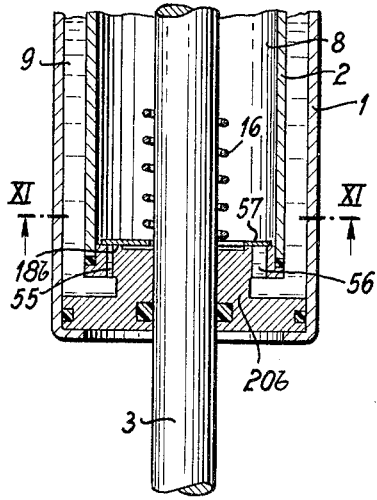
FIG. 10 is an axially sectional fragmentary view of another unit taken on the line X—X in FIG. 11.
Figure 11:
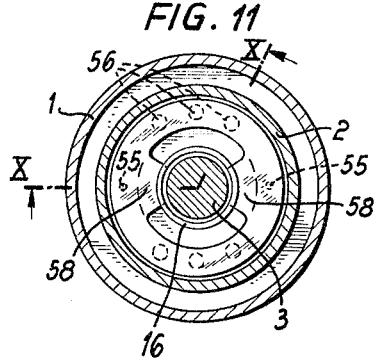
FIG. 11 shows the unit of FIG. 10 in plan section on the line XI—XI.

FIGS. 10 and 11 show the lower end of a suspension unit which differs only in certain detail from that illustrated in FIG. 1, but may also be combined with many features of the unit shown in FIG. 2. The casing 1 and the cylinder 2 are jointly sealed at the bottom by a plug 20b similar to the plug 20 but having two narrow axial bores 55 and six relatively wide bores 56 arranged along a circle about the axis of the unit as is best seen in FIG. 11, two groups of three wide bores 56 being interposed between the diametrically opposite narrow bores 55. All bores extend between the lower cylinder compartment 8 and the liquid storage chamber 9. Their upper orifices are in an annular projection 18b of the plug 20b contiguously adjacent the inner wall of the cylinder 2 so that the remainder of the plug surface between the projection 18b and the piston rod 3 is axially recessed.

The bores 55, 56 are normally covered by a flat valve disk 57 of resilient material which has an annular peripheral portion from which two lugs 58 extend radially inward toward the piston rod 3. The valve disk 57 is secured against rotation relative to the plug 20 in a manner not further illustrated, and the lugs 58 are radially aligned with the narrow bores 55. A helical spring 16 coiled on the piston rod 3 is of a diameter to engage the lugs 58 only.

When the non-illustrated piston of the unit shown in FIGS. 10 and 11 is driven upward by a heavy applied load, and it is necessary to pump additional liquid into the cylinder 2 to level the vehicle, the several bores 55, 56 are opened by the valve disk 57 which is lifted from the seating projection 18b by the higher liquid pressure in the storage compartment 9 during the suction stroke of the pump, as has been described above. The relatively large combined flow section of the bores offers minimum resistance to the flow of liquid inward of the cylinder.

When the piston moves outward of the cylinder 2 in response to the removal of an external load, the spring 16 abuts against the lugs 58 and selectively tilts those portions of the resilient valve disk 57 which cover the narrower bores 55, thereby damping the return flow of liquid from the cylinder 2 of the storage chamber 9. This arrangement prevents a change of vehicle level in response to a transient reduction of the load on the suspension unit. It also permits the use of a relatively weak spring 16 since the spring need not overcome the pressure differential between the storage chamber 9 and the lower cylinder compartment 8 applied to the relatively large portion of the disk 57 which covers the orifices of the bores 56.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. In a hydropneumatic suspension unit, in combination:
    (a) a cylinder member having an axis and defining a cylinder space therein;
    (b) a piston member axially reciprocable in said space between two terminal positions, said piston member axially dividing said cylinder space into two compartments;
    (c) a liquid substantially filling said compartments;
    (d) air cushion means in pressure transmitting engagement with said liquid;
    (e) a storage chamber;
    (f) a supply of said liquid in said chamber;
    (g) pressure means for maintaining the liquid in said storage chamber under pressure;
    (h) resilient valve means interposed between said storage chamber and one compartment of said cylinder space for normally separating the liquid in said storage chamber from the liquid in said cylinder space under the resilient force of said valve means, said valve means including
        (1) a valve seat member formed with a conduit having respective orifices in said storage chamber and in said one compartment, said valve seat member having an annular face in a plane about the orifice of said conduit in said one compartment, and
        (2) a valve disk member in said one compartment, said valve disk member having a face portion normally sealingly engaging said annular face; and
    (i) yieldably resilient abutment means on said piston member engageable with said valve disk member for moving said face portion thereof away from said plane when said piston member approaches one of the terminal positions thereof.

2. In a unit as set forth in claim 1, said valve disk member having another face portion opposite said first-mentioned face portion and being of substantially rigid material, said valve means further including a biasing spring engaging one of said face portions and urging said disk member toward the associated orifice, said abutment means being engageable with the other face portion of said valve disk member for moving the same away from said orifice against the urging of said biasing spring.

3. In a unit as set forth in claim 1, the pressure of said air cushion means transmitted to the liquid in at least one of said compartments being higher than the pressure maintained by said pressure means in the liquid in said storage chamber.

4. In a unit as set forth in claim 1, a hollow piston rod attached to said piston member and enclosing said storage chamber, said valve seat member being integral with said piston member.

5. In a unit as set forth in claim 1, said pressure means maintaining the liquid in said storage chamber under a pressure higher than the pressure transmitted to the liquid in said compartments by said air cushion means.

6. In a unit as set forth in claim 1, said valve disk member and said valve seat member having respective flat contact faces, the contact face of said seat member being formed with one of said orifices and normally being engaged by the contact face of said valve disk member.

7. In a unit as set forth in claim 1, damping means for damping axial movement of said piston member in said cylinder space.

8. In a unit as set forth in claim 7, said damping means including a throttling conduit connecting said compartments.

9. In a unit as set forth in claim 8, said piston member being formed with an axial bore therethrough, said bore constituting said throttling conduit.

10. In a unit as set forth in claim 7, said damping means including a plurality of throttling conduits connecting said compartments, said piston member being formed with a plurality of axial bores therethrough, said bores respectively constituting said throttling conduits, and two one-way valve means normally closing respective ones of said bores and responsive to a pressure in respective ones of said compartments higher than the pressure in the other compartment for opening the associated bore.

11. In a unit as set forth in claim 7, a portion of said cylinder member engageable by said piston member being formed with an axial groove therein, said groove constituting said damping means.

12. In a hydropneumatic suspension unit, in combination:
    (a) a cylinder member having an axis and defining a cylinder space therein;
    (b) a piston member axially reciprocable in said space between two terminal positions, said piston member axially dividing said cylinder space into two compartments;
(c) a liquid substantially filling said compartments;
(d) air cushion means in pressure transmitting engagement with said liquid;
(e) a storage chamber;
(f) a supply of said liquid in said chamber;
(g) pressure means for maintaining the liquid in said storage chamber under pressure;
(h) resilient valve means interposed between said storage chamber and one compartment of said cylinder space for normally separating the liquid in said storage chamber from the liquid in said cylinder space under the resilient force of said valve means, said valve means including
    (1) a valve seat member formed with a conduit having respective orifices in said storage chamber and in said one compartment, and
    (2) a valve disk member in said one compartment and normally sealingly engaging the orifice of said conduit in said compartment; and
(i) yieldably resilient abutment means on said piston member engageable with said valve disk member for moving the same away from said orifice in said one compartment when said piston member approaches one of the terminal positions thereof,
    (1) said abutment means including a spring member mounted on said piston member and compressible in said axial direction, said spring member having an axial end portion engaging said valve disk member when said piston member approaches said one terminal position thereof.

13. In a unit as set forth in claim 12, said spring member being helical about an axis extending in the direction of movement of said piston member.

14. In a hydropneumatic suspension unit, in combination:
(a) a cylinder member having an axis and defining a cylinder space therein;
(b) a piston member axially reciprocable in said space between two terminal positions, said piston member axially dividing said cylinder space into two compartments;
(c) a liquid substantially filling said compartments;
(d) air cushion means in pressure transmitting engagement with said liquids;
(e) a storage chamber;
(f) a supply of said liquid in said chamber;
(g) pressure means for maintaining the liquid in said storage chamber under pressure;
(h) resilient valve means interposed between said storage chamber and one compartment of said cylinder space for normally separating the liquid in said storage chamber from the liquid in said cylinder space under the resilient force of said valve means, said valve means including
    (1) a valve seat member formed with a conduit having respective orifices in said storage chamber and in said one compartment, and
    (2) a valve disk member of resilient material having a portion fastened to said cylinder member and a free portion in said one compartment, said free portion having two opposite faces, a part of one of said faces normally sealingly engaging the orifice of said conduit in said compartment under the resilience of said valve disk member; and
(i) yieldably resilient abutment means on said piston member engageable with another part of said one face of said valve disk member for moving the same away from said orifice in said one compartment when said piston member approaches one of the terminal positions thereof.

15. In a hydropneumatic suspension unit, in combination:
(a) a cylinder member having an axis and defining a cylinder space therein;
(b) a piston member axially reciprocable in said space between two terminal positions, said piston member axially dividing said cylinder space into two compartments;
(c) a liquid substantially filling said compartments;
(d) air cushion means in pressure transmitting engagement with said liquid;
(e) a storage chamber;
(f) a supply of said liquid in said chamber;
(g) pressure means for maintaining the liquid in said storage chamber under pressure;
(h) resilient valve means interposed between said storage chamber and one compartment of said cylinder space for normally separating the liquid in said storage chamber from the liquid in said cylinder space under the resilient force of said valve means, and for connecting said storage chamber and said one compartment in response to a pressure in said one compartment lower than the pressure in said storage chamber by a predetermined amount, said valve means including
    (1) a valve seat member formed with a conduit having respective orifices in said storage chamber and in said one compartment, and
    (2) a valve disk member in said one compartment and normally sealingly engaging the orifice of said conduit in said compartment;
(i) yieldably resilient abutment means on said piston member engageable with said valve disk member for moving the same away from said orifice in said one compartment when said piston member approaches one of the terminal positions thereof; and
(j) pressure responsive valve means interposed between said compartments for selectively connecting the same in response to a pressure in said one compartment greater than the pressure in the other compartment.

16. In a hydropneumatic suspension unit, in combination:
(a) a cylinder member having an axis and defining a cylinder space therein;
(b) a piston member axially reciprocable in said space between two terminal positions, said piston member axially dividing said cylinder space into two compartments;
(c) a liquid substantially filling said compartments;
(d) air cushion means in pressure transmitting engagement with said liquid;
(e) a storage chamber;
(f) a supply of said liquid in said chamber;
(g) pressure means for maintaining the liquid in said storage chamber under pressure;
(h) resilient valve means interposed between said storage chamber and one compartment of said cylinder space for normally separating the liquid in said storage chamber from the liquid in said cylinder space under the resilient force of said valve means, said valve means including
    (1) a valve seat member formed with a conduit having respective orifices in said storage chamber and in said one compartment, and
    (2) a valve disk member in said one compartment
    (3) said valve seat member being formed with a duct having respective orifices in said storage chamber and in said one compartment, the cross sectional area of the orifice of said duct in said one compartment being greater than the cross sectional area of the corresponding orifice of said conduit,
    (4) said valve disk member being of yieldably resilient material, respective portions of said valve disk member normally sealingly engaging the orifices of said conduit and of said duct in said one compartment;
(i) yieldably resilient abutment means on said piston member engageable with said valve disk member for selectively moving the portion of said valve disk member associated with the orifice of said conduit from the latter orifice when said piston member approaches one of said terminal positions thereof, the portion of said valve disk member associated with the orifice of said duct being responsive to a pressure in said one compartment lower than the pressure in said storage chamber by a predetermined amount for connecting said one compartment and said storage chamber.

17. In a hydropneumatic suspension unit, in combination:
(a) a casing;
(b) a cylinder member having an axis and defining a cylinder space therein, said cylinder member being mounted within said casing;
(c) a piston member axially reciprocable in said space between two terminal positions, said piston member axially dividing said cylinder space into two compartments;
(d) a liquid substantially filling said compartments;
(e) air cushion means in pressure transmitting engagement with said liquid;
(f) a storage chamber in said casing;
(g) a supply of said liquid in said chamber;
(h) pressure means for maintaining the liquid in said storage chamber under pressure;
(i) a plug member mounted in said casing and sealingly closing said cylinder space in an axial direction;
(j) a piston rod member fastened to said piston member and axially slidable in said plug member inward and outward of said cylinder space;
(k) resilient valve means interposed between said storage chamber and one compartment of said cylinder space for normally separating the liquid in said storage chamber from the liquid in said cylinder space under the resilient force of said valve means, said valve means including
(1) a valve seat integral with said plug member and formed with a conduit having respective orifices in said storage chamber and in said one compartment, and
(2) a valve disk member in said one compartment and normally sealingly engaging the orifice of said conduit in said compartment; and
(l) yieldably resilient abutment means on said piston member engageable with said valve disk member for moving the same away from said orifice in said one compartment when said piston member approaches one of the terminal positions thereof.

18. In a unit as set forth in claim 1, said valve disk member being freely movable away from said annular face in response to a fluid pressure in said storage chamber greater than the fluid pressure in said one compartment by a predetermined amount.

19. In a hydropneumatic suspension unit, in combination:
(a) a cylinder member having an axis and defining a cylinder space therein;
(b) a piston member axially reciprocable in said space between two terminal positions, said piston member axially dividing said cylinder space into two compartments;
(c) a liquid substantially filling said compartments;
(d) air cushion means in pressure transmitting engagement with said liquid;
(e) a storage chamber;
(f) a supply of said liquid in said chamber;
(g) pressure means for maintaining the liquid in said storage chamber under pressure;
(h) resilient valve means interposed between said storage chamber and one compartment of said cylinder space for normally separating the liquid in said storage chamber from the liquid in said cylinder space under the resilient force of said valve means, said valve means including
(1) a valve seat member formed with a conduit having respective orifices in said storage chamber and in said one compartment, and
(2) a valve disk member in said one compartment and normally sealingly engaging the orifice of said conduit in said compartment; and
(i) yieldably resilient abutment means on said piston member engageable with said valve disk member for moving the same away from said orifice in said one compartment when said piston member approaches one of said terminal positions thereof
(1) said valve disk member being a ring of resilient material, one portion of said ring being supported on said valve seat member against movement in an axial direction, and
(2) said abutment means engaging another portion of said ring spaced from said one portion and from said valve seat member when said piston member approaches said one terminal position thereof.

References Cited by the Examiner
UNITED STATES PATENTS

| | | | |
|---|---|---|---|
| 3,033,556 | 5/1962 | Wossner | 267—64 |
| 3,085,796 | 4/1963 | Wettstein | 267—64 |
| 3,128,088 | 4/1964 | Puschakarnis | 267—64 |
| 3,147,966 | 9/1964 | Axthammer et al. | 267—64 |
| 3,148,871 | 9/1964 | Wilkins et al. | 267—64 |

FOREIGN PATENTS 74,313    11/1960    France.

ARTHUR L. LA POINT, *Primary Examiner.*
R. FIELD, R. M. WOHLFARTH, *Assistant Examiners.*